United States Patent

Tajima et al.

Patent Number: 5,294,851
Date of Patent: Mar. 15, 1994

[54] SMALL-SIZED DC MOTOR

[75] Inventors: Kazuo Tajima; Keisuke Nakahara; Toshio Hinami; Hiromichi Saito; Yoko Okano, all of Tokyo, Japan

[73] Assignee: NKK Corporation, Tokyo, Japan

[21] Appl. No.: 859,477

[22] PCT Filed: Nov. 8, 1990

[86] PCT No.: PCT/JP90/01449
§ 371 Date: Jun. 15, 1992
§ 102(e) Date: Jun. 15, 1992

[87] PCT Pub. No.: WO92/09135
PCT Pub. Date: May 29, 1992

[30] Foreign Application Priority Data

Nov. 2, 1990 [JP] Japan .................. 2-295220

[51] Int. Cl.$^5$ ............................ H02K 11/00
[52] U.S. Cl. .................. 310/68 C; 310/40 MM; 310/71
[58] Field of Search .......... 310/40 MM, 68 C, 43, 310/72, 71, 89, 148; 361/27, 106

[56] References Cited

U.S. PATENT DOCUMENTS

| Re. 31,367 | 8/1983 | D'Entremont | 310/68 C |
| 4,272,714 | 6/1981 | Vind | 310/71 |
| 4,408,244 | 10/1983 | Weible | 310/68 C |
| 4,926,077 | 5/1990 | Gauthier | 310/68 C |
| 5,003,208 | 3/1991 | Hama | 310/68 C |
| 5,010,264 | 4/1991 | Yamada | 310/72 |
| 5,140,205 | 8/1992 | Baines | 310/68 C |
| 5,170,307 | 12/1992 | Nacewicz | 310/68 C |

FOREIGN PATENT DOCUMENTS

| 49-85 | 1/1974 | Japan . |
| 53-91358 | 8/1978 | Japan . |
| 55-51627 | 4/1980 | Japan . |
| 59-30653 | 8/1982 | Japan . |
| 61-173648 | 8/1986 | Japan . |
| 63-110601 | 5/1988 | Japan . |
| 63-210057 | 9/1988 | Japan . |
| 63-215545 | 9/1988 | Japan . |
| 63-312616 | 12/1988 | Japan . |
| 3155352 | 11/1989 | Japan . |
| 3-155353 | 7/1991 | Japan . |

Primary Examiner—R. Skudy
Attorney, Agent, or Firm—Ladas & Parry

[57] ABSTRACT

A small D.C. motor (1) provided with a flat circular or square PTC thermistor (8) between an input terminal (7) and phosphor bronze plate (6) connected to the motor brush (5). The thermistor has electrodes on both faces and an opening provided substantially in its central portion, and it is fitted on the inside or outside of the motor casing (2). The motor shaft (9) or an extension thereof is passed through the opening in the thermistor in such a manner that the plate surface of the PTC thermistor (8) is nearly perpendicular to the shaft (9).

10 Claims, 6 Drawing Sheets

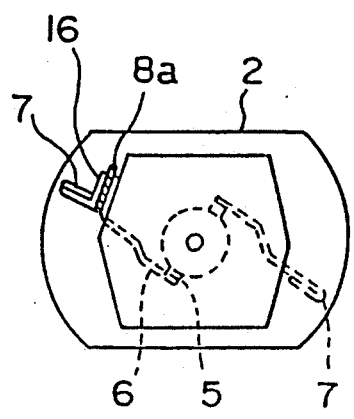
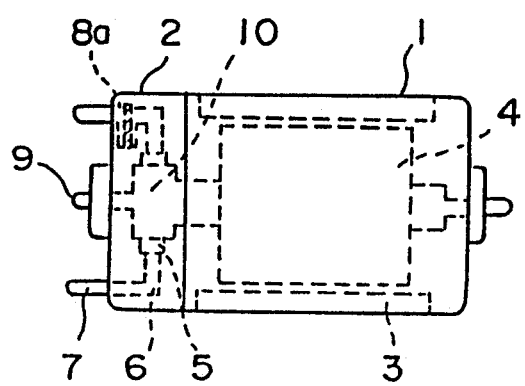
FIG.3A  FIG.3B
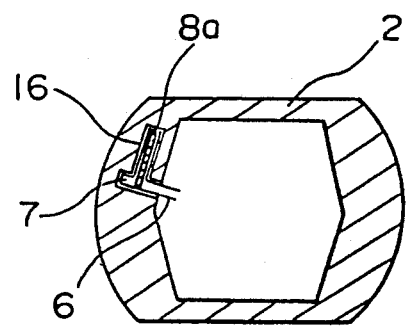
FIG.3C

SMALL-SIZED DC MOTOR

TECHNICAL FIELD

The present invention relates to a small-sized DC motor characterized in that a PTC (positive temperature coefficient) thermistor which is applied to a fixed-temperature heating resistor, a temperature sensor, a current limiting element, and so on, is incorporated into or circumscribed on the motor as the overload protection element for the motor.

BACKGROUND OF THE INVENTION

Mainly a bimetal, a PTC thermistor, etc. are known as over-current protection elements to be used as a counter measure an overload of a small-sized DC motor, and there is a tendency that those elements are particularly used in the automobile industry.

Of those elements, a bimetal is connected in series mainly to a motor having a diameter of 40 mm or more, that is, having an overload current of about 5 A or more, and usually used as the motor built-in type.

Generally, when an overload current is not larger than 5 A, the accuracy of switching operation of a bimetal is low so that the bimetal fails to perform stable operation. Accordingly, a PTC thermistor having a cost lower than that of the bimetal is broadly used.

As is known, a PTC thermistor is a resistor element having a positive temperature coefficient, and although the resistance value thereof is low at an ordinary temperature, the value suddenly increases to be $10^4$–$10^7$ times as large as the value at an ordinary temperature if the element reaches or exceeds a predetermined switching temperature because of self heating due to an overcurrent or heat transfer from a certain heat source.

A PTC thermistor made of $BaTiO_3$ ceramics is most generally known, and a PTC thermistor of $V_2O_3$ ceramic, a resin PTC thermistor in which conductive particles such as carbon black or the like are contained in polyolefin resin, and the like, are known in addition to the $BaTiO_3$ PTC thermistor.

Conventionally, a PTC thermistor to be used in a small-sized DC motor is made of semiconductor ceramics containing $BaTiO_3$ as the principal component. Because of limitation in the material characteristic that the resistivity of the material must be not lower than 8 $\Omega$cm and the withstand voltage be in a range of 30–50 V, in use, a PTC thermistor is usually connected in series to a motor as a disk-like part provided with a lead wire having a diameter not thinner than 10–12 mm. Since a PTC thermistor cannot be incorporated into a motor because of its shape and its size, however, it is general that a separate PTC thermistor is mounted on the outside a motor through a printed wiring board or the like.

Consequently, there has been a problem that it takes a long time to mount a PTC thermistor, and development of a small-sized motor, even a small-sized motor having a diameter smaller than 40 mm, provided with an overload protection element is desired by a car industrial field, etc., who seek reduction in size and in weight.

In such a background, the inventors of this application previously proposed "A small-sized DC motor" (Japanese Patent Application No. Hei-1-292397) and "A small-sized DC motor (Japanese Patent Application No. Hei-1-292398). They are those structured fundamentally with materials having characteristics considerably improved than those of the conventional materials. Next, those motors will be described.

The first small-sized DC motor disclosed in Japanese Patent Application No. Hei-1-292397 is characterized in that a $BaTiO_3$ ceramic in which the ratio ($V_B/\rho_{25}$) of the withstand voltage $V_B$ (V) to an ordinary-temperature resistivity $\rho_{25}$ ($\Omega$cm) is not smaller than 7 and not larger than 20 is connected in series to an armature winding and the PTC thermistor is incorporated in a motor casing. The $BaTiO_3$ ceramic is formed of, as starting raw materials, a mixed crystal or a solid solution of $BaTiO_3$, $SrTiO_3$, $PbTiO_3$, and $CaTiO_3$ synthesized through a liquid-phase solution reaction method, and a valency control agent and Mn and Si which are added to the above principal components by predetermined amounts. Further, as the arrangement position of the PTC thermistor made of the foregoing materials, places such as a position between a phosphor-bronze plate connected to a brush of the small-sized DC motor and input terminals, a position between the brush and the phosphor-bronze plate connected to the input terminals, etc. have been proposed.

The small-sized DC motor disclosed in Japanese Patent Application No. Hei-1-292398, on the other hand, is characterized in that a resin PTC thermistor is connected in series to an armature winding and incorporated in a casing of the motor. The material of the PTC thermistor a mixture of polyolefin or halogen-insulating resin and a high conductive material of a carbon group, the mixture generally having ordinary-temperature resistivity of 1–2 $\Omega$cm and withstand voltage not lower than 100 V. Further, as the position where the PTC thermistor made of the foregoing material is to be provided, a position between a phosphor-bronze plate connected to an input terminal and a brush of the small-sized Dc motor, a position between the brush and the phosphor-bronze plate connected to the input terminal, etc., have been proposed.

Both the above small-sized DC motors are characterized in that the PTC thermistor is formed into a small-sized or thin plate-like chip or into a cylindrical shape or a shape according the foregoing shape and disposed in the inside of the motor, on the basis of the fact that the material characteristic of the PTC thermistor, particularly, the withstand voltage and the ordinary-temperature resistivity have been considerably improved.

Each of the above proposed small-sized DC motors, however, has the following problems, while the PTC thermistor superior in material characteristic is formed like a chip and incorporated into the motor so as to make the motor have an overload protecting function itself and be reduced in size as well as in weight/:

(1) With respect to the position where the PTC thermistor is incorporated in the small-sized DC motor and the shape of the PTC thermistor, a plate-like PTC thermistor having electrodes at its opposite surfaces and being arranged between the input terminal and the phosphor-bronze plate connected to the brush, a PTC thermistor having electrodes at its opposite surfaces and being arranged between the input terminal and the phosphor-bronze plate connected to the brush, a cylindrical PTC thermistor having electrodes at its opposite end surfaces and being arranged on a terminal board, etc. have been proposed. In each of the cases, there is a possibility of occurrence of problems that the space for position of arrangement is very small so that the size of the chip-shaped PTC thermistor is limited because of the foregoing limitation of the space, the mounting is not easy, the PTC thermistor may be allowed to come off or damaged by vibrations and/or shocks.

(2) In a motor having internal resistance not larger than about 4 Ω even if the motor has a diameter not larger than 40 mm, the PTC thermistor which matches with the motor must have a resistance value not larger than 1 Ω. Assuming that such a PTC thermistor is formed by using the materials proposed in Japanese Patent Application No. Hei-1-292397, then the size of the thermistor is not smaller than about 5 mm×5 mm in the case of the square chip, and in order to mount the PTC thermistor in the casing with no problem, a considerable device is required in view of space and vibration-resistance.

(3) Although detailed description will be made later with respective to the embodiment, a PTC thermistor is a heating resistor, and the resistance value of the thermistor under a predetermined condition is determined by a balance between the heat generation of the thermistor itself owing to Joule heat and the heat radiation to the circumference. That is, the resistance value relates to not only the shape of the thermistor and the circumferential heat environment but the heat capacity of the thermistor, that is, the size thereof. In other words, this fact means that the smaller the size of the thermistor becomes the smaller the heat capacity thereof becomes so that thermistor becomes more sensitive against a circumferential influence.

Consequently, in the case where a thermistor is merely decreased in size by using a material having a large ratio of withstand voltage to resistivity at ordinary temperatures and is incorporated in a motor as shown in the preceding proposal, when an overloaded state occurs in the motor, heat generation of a motor coil is transferred to the PTC thermistor through a phosphor-bronze plate or the like by the heat coupling effect so that the temperature of the PTC thermistor is raised easily and there is an advantage that the response of the switching operation of the PTC thermistor is made high, and in the current limiting state, on the contrary, the withstand voltage is made high as if a radiation plate is provided. There is, however, a defect in that the Joule heat of the PTC thermistor is transferred to the motor to thereby increase the limitation current value. Consequently, if the PTC thermistor is merely reduced in size, a bad influence is rather generated in view of heat capacity.

(4) The fundamental point of the foregoing proposals is in the material in which the ratio of the withstand voltage to the ordinary-temperature resistivity is remarkably improved in comparison with the conventional one. The material is a BaTiO$_3$ PTC ceramic synthesized through the liquid-phase solution reaction method, or PTC resin. Those materials are higher in cost than BaTiO$_3$ ceramic prepared by the conventional solid phase method, and therefore such a PTC thermistor that can be incorporated in a motor even if it is made of the conventional material has been desired.

DISCLOSURE OF THE INVENTION

An object of the present invention is to provide a small-sized DC motor in which a PTC thermistor which can be incorporated in the motor even when it is formed of a conventional material, which can be easily mounted attached even if the motor has a diameter not larger than 40 mm and internal resistance not larger than about 4 Ω, which has no problem in space and in vibration resistance, and which is inexpensive.

Three important factors in configuration of the present invention are as follows.

A first one is how to increase the withstand voltage with the conventional material. That is, if the withstand voltage can be increased, the thickness of the element can be reduced and the element is decreased in size to thereby make it possible to be incorporated in or to be circumscribed on a motor.

Next, the withstand voltage of a PTC material will be described.

As shown in FIG. 4, the PTC material, particularly the BaTiO$_3$ ceramic PTC material, is a semiconductor generally having of such a resistance/temperature characteristic that the temperature gradient has a negative gentle gradient in the vicinity of an ordinary temperature (an NTC region), but the resistance value suddenly increases with a rate of change of about $10^4$–$10^7$ times (a PTC region) when the temperature exceeds a Curie point A as shown in FIG. 4. Then, a negative temperature gradient is generated again (NTC (negative temperature coefficient) region) when the temperature further increases to exceed a point B.

FIG. 5 shows the voltage/current characteristic of the PTC ceramic material having such a resistance/temperature characteristic. In FIG. 5, the region from a point P to a point Q is a fixed-resistance region where a current increases in proportion to voltage rising, and the temperature of the element is raised gradually by Joule heat, and the region corresponds to the fixed-resistance region from the ordinary temperature to the Curie point in FIG. 4. The region from the point Q to a point R in FIG. 5 is a fixed-power region where the current decreases in inverse proportion to voltage rising and corresponds to the PTC region from the point A to the point B in FIG. 4. In FIG. 5, when the voltage is further increased, the temperature of the element further rises to enter the NTC region not lower than the point B of FIG. 4, and therefore the element is burned out by the excessive temperature increase. The voltage immediately before the burnout break is called withstand voltage $V_B$ of a PTC material.

Thus, unlike the dielectric strength a dielectric, the withstand voltage of the PTC ceramic is defined to be a voltage which can endure burnout break due to Joule heat. Unlike the BaTiO$_3$ PTC material, a resin PTC material has no NTC region not lower than the point B in FIG. 4, and it is therefore considered that the withstand voltage of the resin PTC material rather corresponds to the dielectric strength of the resin itself.

Since the withstand voltage of a generally widely used BaTiO$_3$ PTC material is a voltage which can endure burnout break due to Joule heat as described above, it is said that the withstand voltage varies in accordance with the condition of radiation of Joule heat from the element. That is, the withstand voltage of the PTC material is not a physical constant but a value synthetically determined in accordance with not only the material characteristic of the element but the shape thereof, the circumferential heat environment, and the like. In the case of evaluating the withstand voltage of the PTC material itself, therefore, the inventors of this application use measurement values obtained when an circular disk having a diameter of 10 mm and a thickness of 1 mm is set at a predetermined temperature and in a atmosphere where no convection exists. In view of part design, on the other hand, in order to raise the dielectric strength, such a measure that, for example, a heat radiation plate is attached onto a PTC thermistor is widely carried out to improve the heat radiation property.

From such a point of view, the inventors of this application have earnestly investigated the shape of a PTC thermistor which can be incorporated in a motor and which can improve the withstand voltage, and as a result, they have found that the above condition can be satisfied by a so-called doughnut-shaped PTC thermistor which is formed of an annular or square plate-like body or a plate-like body similar to the former, an opening portion being formed at the center of the plate-like body.

That is, the inventors have found that doughnut-shaped PTC thermistors have larger dielectric strength than others when thermistors having the same resistance value and the same thickness are designed by use of the same PTC material. Conventionally, although doughnut-shaped PTC thermistors are seen in materials in the trade so as to be well known, there is no knowledge concerning such an improvement of the withstand voltage.

It is considered that in an ordinary annular or square PTC thermistor or an ordinary PTC thermistor having a shape similar to the former, the heat radiation property of the central portion is poorer than that in the circumferential portion, while in such a doughnut-shaped PTC thermistor described above, heat radiation from the thermistor is made uniform and promoted because the central portion is opened so that the withstand voltage is improved. This discovery is the first factor of the present invention.

Next, a second factor will be described. The second factor is such that the opening portion of a doughnut-shaped PTC thermistor is inserted onto a shaft of a small-sized motor or an extension thereof so that the thermistor is incorporated into or circumscribed on a motor casing so as to make the disk-like surface of the thermistor be substantially perpendicular to the shaft, whereby the thermistor having electrodes at its opposite surfaces is arranged between an input terminal and a phosphorbronze plate connected to a brush of the motor. When fixed, preferably, the thermistor is mounted in the motor casing and then sealed with a shielding material such as silicon resin having a high heat-radiation property. If arranged as above, the PTC thermistor is located so as to be axis-symmetrical with respect to the shaft of the motor and the vibration resistance and the shock resistance are extremely improved owing to an effect of the elasticity of resin.

Further, a third factor is a heat coupling effect between the PTC thermistor and the motor coil when the PTC thermistor is incorporated in or circumscribed on the motor. That is, in the method according to the present invention, (1) there is generated such an effect that when the motor comes into an overloaded state, such a heat coupling effect that heat generation of the motor coil is transferred to the PTC thermistor through the phosphor-bronze plate is added to an ordinary self heat generation of the PTC due to an overcurrent so that the response property of the switching operation of the PTC thermistor is further improved. (2) Further, when the motor comes into a current limitation state, on the other hand, there is generated such an effect that the heat radiation rate increases so that the dielectric strength of the PTC thermistor is further improved because the phosphor-bronze plate reversely acts as a heat radiation plate for the PTC thermistor. In this case, in the method according to the present invention, the degree of freedom in designing the size of the PTC thermistor is large in view of the position of arrangement and the manner of mounting, and therefore, unlike the method of the foregoing proposals, the increase in the limitation current value in the current limitation state can be reduced as small as possible if design is made in consideration of the heat capacity.

BRIEF DESCRIPTION OF DRAWINGS

FIGS. 3a, 3b and 3c are explanatory diagrams schematically showing a comparison example of the small-sized DC motor in which a PTC thermistor C used in the preceding proposal is incorporated.

BEST MODE FOR CARRYING OUT THE INVENTION

EXAMPLE 1

Figure 1A:
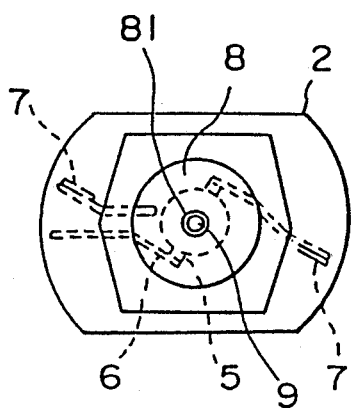
FIGS. 1a and 1b are explanatory diagrams schematically showing an embodiment of the small-sized DC motor according to the present invention in which a PTC thermistor B is incorporated.

Basic bodies of a PTC thermistor A (FIG. 2, element 14) constituted by an ordinary annular disk having a diameter of 10 mm and thickness of 0.6 mm and a PTC thermistor B (FIG. 1, element 8) constituted by a doughnut-shaped disk having an outer diameter of 12 mm, and an inner diameter of 6.5 mm, and thickness of 0.6 mm were prepared by using an ordinary $BaTiO_3$ PTC ceramic material in which the ordinary-temperature resistivity value $\rho_{25}$ was 8 $\Omega$ cm, the withstand voltage $V_{B(s)}$ (hereinafter, referred to as "standard withstand voltage") was about 50 V in the condition of a diameter of 10 mm and a thickness of 1 mm, and the Curie point was about 100° C. Then, silver electrodes were applied onto opposite surfaces of each of the basic bodies to thereby form PTC thermistors. The thus formed PTC thermistors have the same disk area and thickness, and have the same resistance value of 0.6 $\Omega$. Next, a point-contact electrode was set on each of the PTC thermistors, and a voltage was gradually applied to each PTC thermistor in a constant-temperature oven of 25° C. to thereby measure the withstand voltage. The measurement result of the disk B was 40 V, although that of the disk A was 30 V.

It is found from the measurement results that even in the case of forming PTC thermistors by use of the same material and so as to have the same area, the same thickness, and the same resistance value, the withstand voltage of a so-called doughnut-shaped thermistor having an opening at or substantially at its central portion is higher than others. That is, it is found that the withstand voltage which is one of the important factors in design of parts of a PTC thermistor is further improved, and therefore if the PTC thermistor is formed into a doughnut shape, the parts may be made thin and the disk area may be made smaller.

EXAMPLE 2

Lead wires and a molding agent were further applied to the disk formed in Example 1 to thereby form an ordinary PTC thermistor A provided with lead wires. A square chip having a size of 6 mm×6 mm and having thickness of 0.4 mm was prepared by using a material having an ordinary-temperature resistivity value of 5 Ω cm, standard withstand voltage of 90 V and a Curie point of about 100° C. as the high-withstand voltage and low-resistivity material disclosed in Japanese Patent Application No. Hei-1-292387, and then silver electrodes were respectively applied onto the opposite surfaces of the square chip to thereby form a square chip-shaped PTC thermistor C. The resistance value of the PTC thermistor C (FIG. 3A, 3B element 8a) was 0.6 Ω and the withstand voltage thereof was 40 V.

Thus, the three kinds of PTC thermistors, that is, the PTC thermistor A (the diameter was 10 mm and the basic body thickness was 0.6 mm) provided with lead wires, the doughnut-shaped PTC thermistor B (the outer diameter was 12 mm, the inner diameter was 6.5, and the basic body thickness was 0.6 mm), and the square chip-shaped PTC thermistor C (the size was 6 mm×6 mm and the basic body thickness was 0.4 mm), were formed. Although the shapes and sizes of the three kinds of PTC thermistors were different from each other, the PTC thermistors have the same resistance value of 0.6 Ω.

Next, three small-sized DC-12 V motors each having internal resistance of about 4 Ω and a diameter of 26 mm were prepared and connected in series to the formed PTC thermistors A, B, and C. Next, the respective methods of connection will be described in detail.

Figure 2:
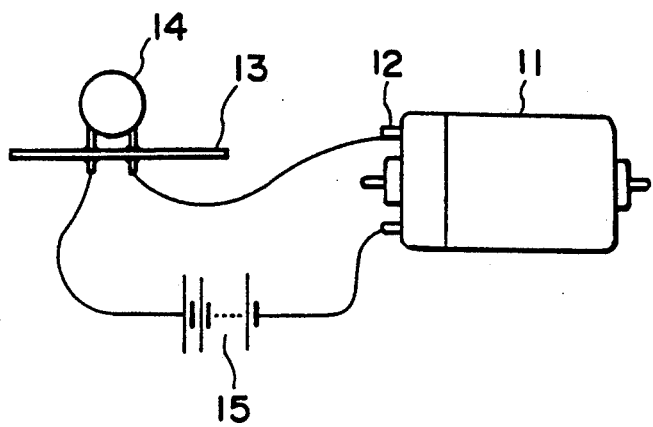
FIG. 2 is an explanatory diagram schematically showing an example of the conventional small-sized DC motor in which a PTC thermistor A is provided on a control substrate.
Figure 4:
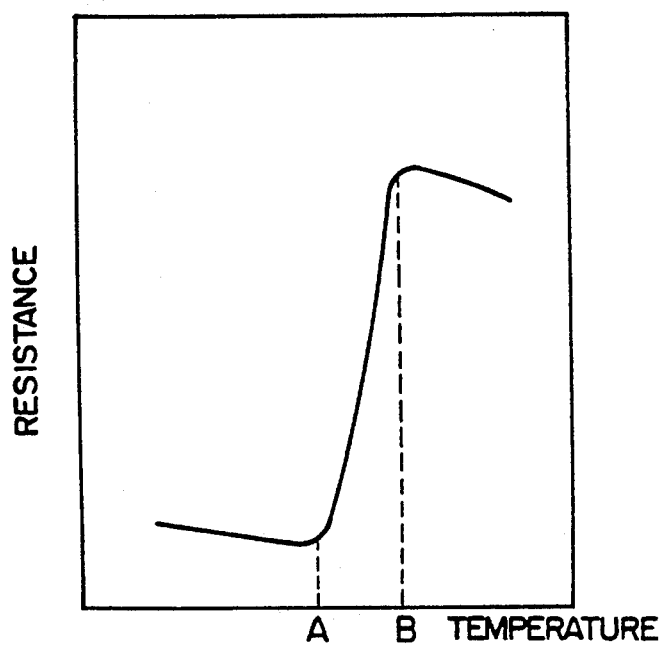
FIG. 4 is a diagram showing the resistance/temperature characteristic of a ceramic PTC material.
Figure 5:
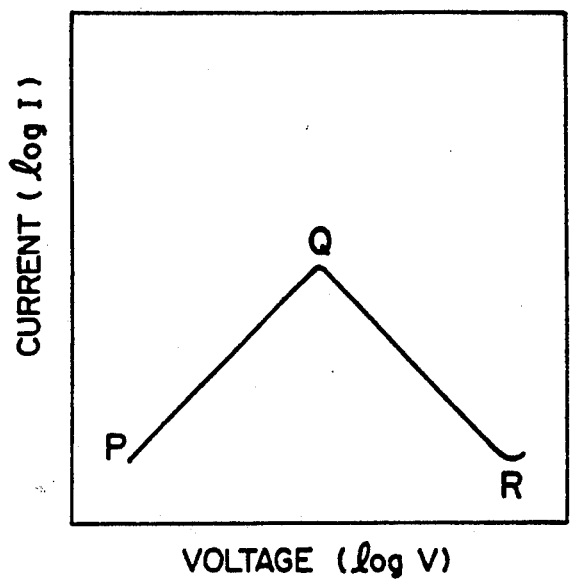
FIG. 5 is a diagram showing the voltage/current characteristic of the ceramic PTC material having the characteristic of FIG. 4.

The PTC thermistor A is of a usually generally-used disk type provided with lead wires. A PTC thermistor A (element 14) is mounted on a printed substrate 13 entirely separately from a motor 11 and connected in series to the motor 11 as shown in FIG. 2. Further, in FIG. 2, the reference numeral 11 designates a small-sized direct current (DC) motor; 12, input terminals of the motor 11; and 15, a DC power source. This connection is the most ordinarily used conventional system.

Figure 1B:
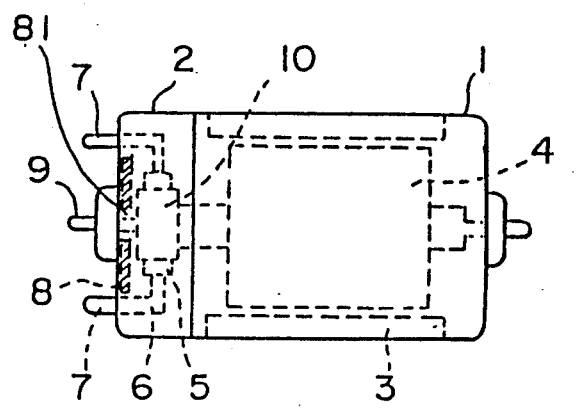

The PTC thermistor B is a doughnut-shaped element having silver electrodes at its opposite surfaces, according to the present invention. As shown in FIG. 1A, an opening 81 of a PTC thermistor B (element 8) is inserted onto a shaft 9 of the foregoing motor 1 so that the PTC thermistor 8 is incorporated into a motor casing 2 so as to be substantially perpendicular to the shaft 9, and the PTC thermistor B is electrically connected between an input terminal 7 and a phosphor-bronze plate 6 connected to a brush 5 of the motor 1. Further, in FIGS. 1A and 1B, the reference numeral 1 designates a motor body; 3, a field magnet; 4, a coil; 7, input terminals; 8, a PTC thermistor B according to the present invention; and 10, a commutator.

The PTC thermistor C is a square chip-shaped one formed on the basis of the foregoing proposal and has silver electrodes at its opposite surfaces. As shown in FIG. 3A and 3C, a groove 16 is formed in the inside of a motor casing 2 so that a PTC thermistor 8a is incorporated in the groove. Further, the PTC thermistor C (element 8a) is electrically connected between an input terminal and a phosphor-bronze plate connected to a brush 5 of the motor 1. Further, in FIG. 3A, 3B and 3C, the reference numerals 1-7 and 10 designate elements the same as or corresponding to those of FIG. 1, and therefore the explanation thereof is omitted. FIG. 3C shows an embodiment of FIG. 3A or 3B in which the groove is formed on the inside of the motor casing 2.

The PTC thermistors were set in a constant-temperature oven (not shown) and the response performance thereof was measured in a state that the motor was locked and under three conditions, that is, the temperature/voltage conditions of −30° C./10 V, 25° C./14 V, and 80° C./14 V. Table 1 shows the measurement results. The conditions were set on the estimation of temperature/voltage fluctuations in ordinary cars.

TABLE 1

|  | Response time $t_1$ (sec) | | | Limit current $I_0$ (A) | | |
| --- | --- | --- | --- | --- | --- | --- |
|  | −30° C./ 10 V | 25° C./ 14 V | 80° C./ 14 V | −30° C./ 10 V | 25° C./ 14 V | 80° C./ 14 V |
| PTC thermistor A | 53 | 10 | 2.5 | 0.24 | 0.14 | 0.12 |
| PTC thermistor B | 21 | 5 | 1.6 | 0.26 | 0.15 | 0.12 |
| PTC thermistor C | 18 | 4 | 1.2 | 0.34 | 0.22 | 0.16 |

Figure 6:
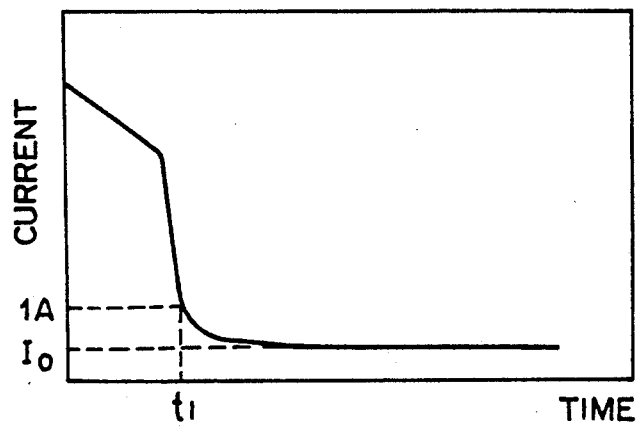
FIG. 6 is a diagram showing the relation between the response time and the limitation current for explaining the table 1.

As shown in FIG. 6, the response time in Table 1 means time $t_1$(sec) required for limiting a circuit current to 1A and the limitation current value in the same table means a stable dark current $I_0$(A) after current limitation.

It is found from Table 1 that in each of the conditions, the response time of the PTC thermistor C, that is, the square chip formed by using the previously proposed material of high-withstand voltage and low-resistance is the shortest and the response time of the PTC thermistor A is the longest. This is, because the volume of the basic body of the PTC thermistor A is about 30% as large as each of the PTC thermistors B and C and hence the heat capacity of the basic body of the PTC thermistor A is small, if the resistance value, that is, the heat value, is the same, the temperature of the PTC thermistor A rises easily and the PTC thermistor A is apt to be subjected to heat coupling with the phosphor-bronze plate. Further, this is because the PTC thermistor A is mounted on the printed substrate separated from the motor, and there is no effect in heat coupling with the motor and the heat environment in the surrounding of the thermistor A directly contacts with the air, so that the rate of temperature rising of the thermistor A is the slowest. In the PTC thermistor B, on the other hand, the heat capacity thereof is the same as that of the PTC thermistor A, while it takes a value near that of the PTC thermistor C because of the heat coupling effect owing to the incorporation.

Further, the differences between the response times corresponding to the three values of the parameter, temperature/voltage, in the case of PTC thermistor B and C of the Table 1 are smaller than one in the case of PTC thermistor A. Reduction of differences between response time relative to a fluctuation of the parameter temperature/voltage is one of the conditions required particularly from the field of car industries.

Further, the limitation current value of the PTC thermistor C is the largest and therefore the power loss is the largest, while that of the PTC thermistor A is the smallest. The limitation current value of the PTC thermistor B is substantially equal to that of the PTC thermistor A although it is slightly higher than that of the PTC thermistor A.

Thus, according to the construction of the present invention, there are both effects that the response performance of the PTC thermistor A of the conventionally widely used system is improved, and that the power loss after current limitation as seen in the PTC thermistor C according to the previously proposed arrangement reduced.

EXAMPLE 3

Figure 7A:
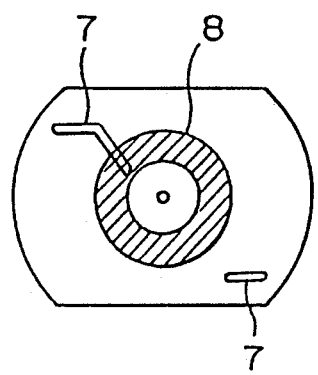
FIGS. 7a and 7b are explanatory diagrams schematically showing another embodiment of the small-sized DC motor according to the present invention in which a PTC thermistor is circumscribed on a motor casing.
Figure 7B:
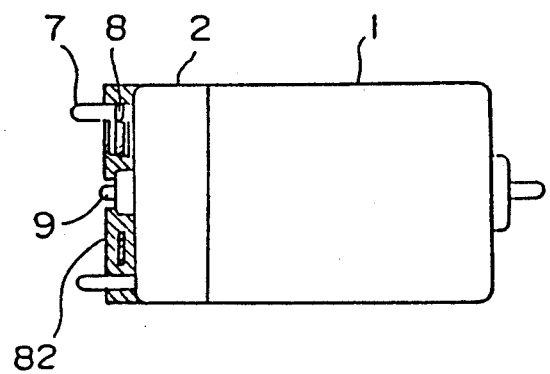

The thermistor formed in Example 1 was circumscribed onto the motor casing of the motor used in Example 2 as shown in FIG. 7. That is, a PTC thermistor B (element 8) was circumscribed onto a motor casing 2 so as to be disposed axis-symmetrically with respect to the extension axis of a shaft 9 of the motor 1 and electrically connected between an input terminal 7 and a phosphor-bronze plate 6 connected to a brush of the motor. After the circumscription, the doughnut-shaped PTC thermistor 8 was sealed with silicon resin 82 having a high thermal conductivity so as to fix the thermistor. The PTC thermistor circumscribed type motor was formed as described above, and the response time and the limitation current value were measured in the same manner as in Example 2. Table 2 shows the measurement results.

TABLE 2

| | Response time $t_1$ (sec) | | | Limit current $I_o$ (A) | | |
| --- | --- | --- | --- | --- | --- | --- |
| | −30° C./ 10 V | 25° C./ 14 V | 80° C./ 14 V | −30° C./ 10 V | 25° C./ 14 V | 80° C./ 14 V |
| PTC thermistor B | 24 | 6 | 1.9 | 0.25 | 0.14 | 0.12 |

It is found from Table 2 that although the response time is slightly longer in comparison with the incorporation type, for example, in the case of the PTC thermistor B of Example 2, the limitation current value is further reduced to thereby reduce a power loss.

As described above, according to the present invention, a PTC thermistor is formed into a doughnut shape and an opening thereof is inserted onto a shaft of a small-sized DC motor or an extension thereof so that the PTC thermistor is incorporated in or circumscribed on a motor casing so as to make the plate surface of the PTC thermistor substantially perpendicular to the shaft. Further, the PTC thermistor is provided between input terminals of the motor. Therefore, the improvement of the two characteristics are attained such that the response performance of the PTC thermistor is improved in comparison with the conventional case where the PTC thermistor is provided on the control substrate and that the power loss after current limitation is reduced in comparison with the conventional case where the plate-like thermistor is incorporated.

We claim:

1. A small-sized DC motor having a PTC thermistor as an over-load protective element comprising:
   said small-sized DC motor having a shaft and a motor casing;
   a plate-like PTC thermistor having an opening formed in a center thereof for increasing withstand voltage of said PTC thermistor, said thermistor being inserted over said shaft and mounted onto said motor casing;
   means for electrically connecting said plate-like PTC thermistor between an input terminal and a phosphorus bronze plate connected to a brush of said small-sized DC motor.

2. A small-sized DC motor according to claim 1 wherein said plate-like PTC thermistor is a plate-like PTC resistance element having a circular shape with an opening in center portion thereof.

3. A small-sized DC motor according to claim 1 wherein said plate-like PTC thermistor is a plate-like PTC resistance element having a square shape with an opening in center portion thereof.

4. A small-sized DC motor according to claim 1 wherein a surface of said plate-like PTC thermistor is incorporated in said motor casing substantially perpendicular to said shaft.

5. A small-sized DC motor according to claim 1 wherein a surface of said plate-like PTC thermistor is circumscribed on said motor casing substantially perpendicular to said shaft.

6. A small-sized DC motor according to claim 1 wherein said plate-like PTC thermistor is mounted in said motor casing with resin having a high thermal conductivity.

7. A small-sized DC motor according to claim 2 wherein said plate-like PTC thermistor is mounted in said motor casing with resin having a high thermal conductivity.

8. A small-sized DC motor according to claim 3 wherein said plate-like PTC thermistor is mounted in said motor casing with resin having a high thermal conductivity.

9. A small-sized DC motor according to claim 4 wherein said plate-like PTC thermistor is mounted in said motor casing with resin having a high thermal conductivity.

10. A small-sized DC motor according to claim 5 wherein said plate-like PTC thermistor is mounted in said motor casing with resin having a high thermal conductivity.

* * * * *